United States Patent [19]
Hannum

[11] Patent Number: 5,336,417
[45] Date of Patent: Aug. 9, 1994

[54] BUCKET GRIT ELEVATOR SYSTEM

[75] Inventor: Joseph R. Hannum, Blue Bell, Pa.

[73] Assignee: The Budd Company, Troy, Mich.

[21] Appl. No.: 946,910

[22] Filed: Sep. 18, 1992

[51] Int. Cl.⁵ .......................................... B01D 21/18
[52] U.S. Cl. ................... 210/803; 210/523;
   210/526; 198/713; 384/281
[58] Field of Search ............... 210/523, 526, 541, 803,
   210/768, 498; 198/713; 384/281, 299, 434;
   220/676; 428/36.92

[56] References Cited

U.S. PATENT DOCUMENTS

| | | | |
|---|---|---|---|
| 206,632 | 7/1878 | Snell | 210/498 |
| 1,819,394 | 8/1931 | Tark | 384/434 |
| 2,588,533 | 3/1952 | Johnson | 210/498 |
| 2,675,283 | 4/1954 | Thomson | 384/299 |
| 3,140,774 | 7/1964 | Johnston et al. | 210/526 |
| 3,244,280 | 4/1966 | Lind et al. | 210/526 |
| 3,381,796 | 5/1968 | Gregor | 198/713 |
| 3,394,816 | 7/1968 | Lowry | 210/526 |
| 3,674,145 | 7/1972 | Schmutzler et al. | 210/526 |
| 3,675,778 | 7/1972 | Hoag | 210/498 |
| 3,768,657 | 10/1973 | Hoag | 210/526 |
| 3,850,801 | 11/1974 | Pearson | 210/151 |
| 4,165,289 | 8/1979 | Borst | 210/769 |
| 4,246,999 | 1/1981 | Bryant et al. | 198/713 |
| 4,366,058 | 12/1982 | Wolde-Michael | 210/526 |
| 4,645,598 | 2/1987 | Hannum | 210/526 |
| 4,663,042 | 5/1987 | Rasper et al. | 210/526 |
| 4,810,383 | 3/1989 | Hannum | 210/526 |
| 5,035,681 | 7/1991 | Hertel et al. | 210/526 |

FOREIGN PATENT DOCUMENTS 21519 11/1955 Fed. Rep. of Germany .
467037 6/1937 United Kingdom .

OTHER PUBLICATIONS

The Budd Company, "Engineered Plastic Conveyor Components", 4 sheets, undated.
The Budd Company, "Non-Metallic Rectangular Clarifier Components for Water and Wastewater Treatment Applications", 12 pages, Sep. 1989.

Primary Examiner—Christopher Upton
Attorney, Agent, or Firm—Harness, Dickey & Pierce

[57] ABSTRACT

A bucket elevator system for a waste water treatment facility is made of non-metallic components. Buckets are carried along a bottom surface of a settling tank and then lifted above the waste water level and tilted to dump the collected waste solids onto an external disposal system. The buckets include a plurality of dewatering slots which allow the water to drain from the buckets as they are lifted from the settling tank. Split block bearing assemblies are provided for drive shafts of the conveyor.

18 Claims, 4 Drawing Sheets

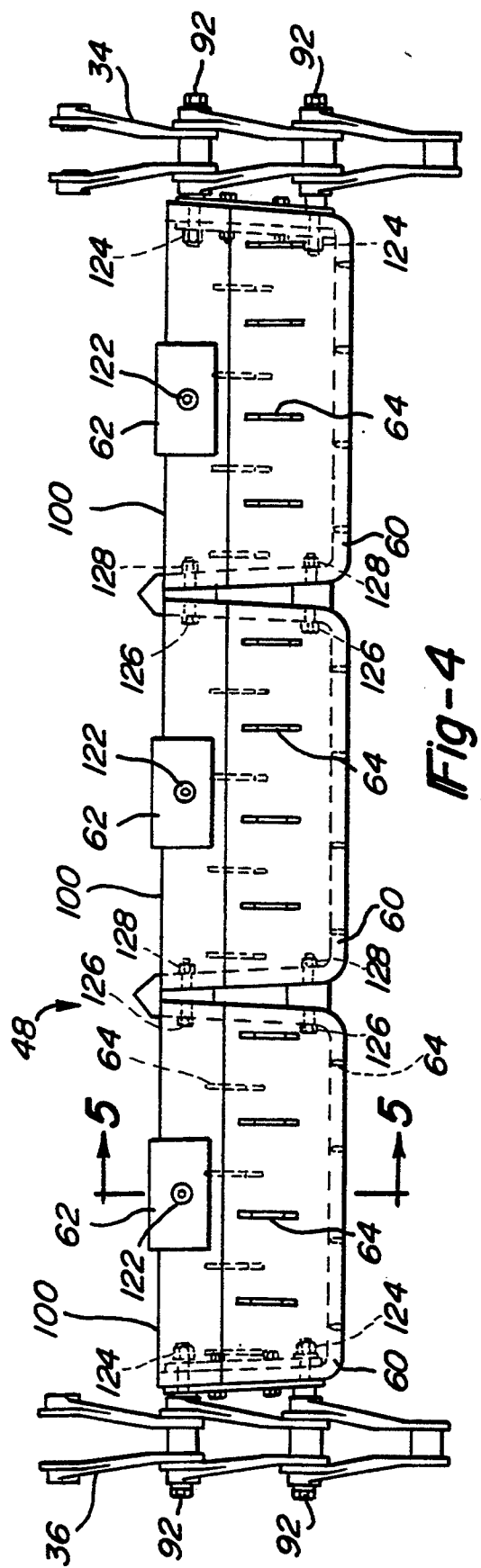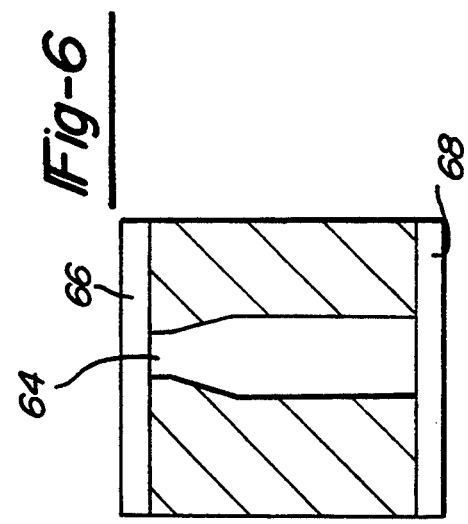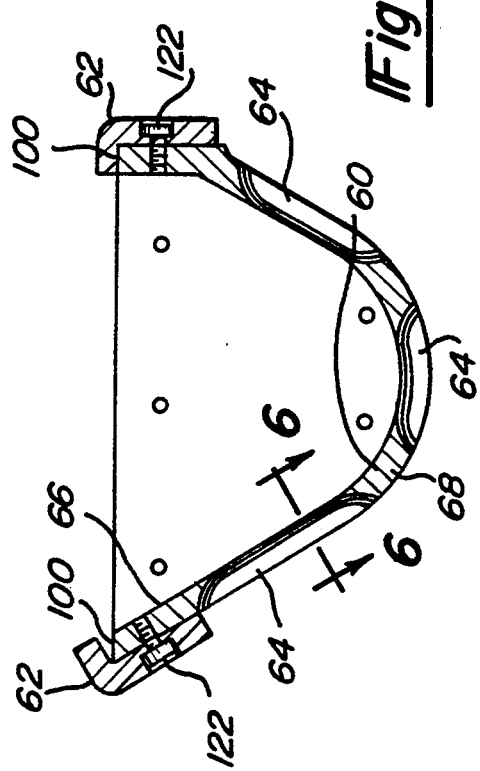

BUCKET GRIT ELEVATOR SYSTEM

BACKGROUND OF THE INVENTION

1. Technical Field

This invention relates generally to conveyor systems, and more particularly to grit removal conveyor systems for use in a corrosive environment.

2. Discussion of The Related Art

In addition to water, waste water typically contains waste solids commonly referred to as grit (i.e., non-biodegradable solids such as stones, sand, or glass), sludge, and scum all requiring separation from the water prior to final treatment. Waste water treatment systems commonly involve multiple filtering stages, of which grit removal is of the utmost importance. Because of the abrasive properties of grit, effective and efficient grit removal during the early treatment stages minimizes wear on a system's subsequent waste water treatment devices. Grit removal systems utilizing settling tanks are well known.

Currently, grit removal systems displaced within a settling tank use steel components to drag, without physically lifting, settled grit along the tank's bottom surface to a disposal means. Unfortunately, the prior art system's steel components have high susceptibility to accelerated corrosion from exposure to air and waste water treatment chemicals during operation and maintenance procedures. In addition, a steel grit removal system is heavy and prone to excessive wear when supporting and dragging the steel components within the system's settling tank. This combination of factors reduces a prior art system's efficiency and durability and increases maintenance costs.

Thus, it would be desirable to produce a grit removal system with reduced weight for increased efficiency and durability and with high immunity to corrosion from exposure to natural elements and chemicals. Further, it would be desirable to provide a technique for removing grit from a settling tank by directly lifting the collected grit from the waste water to a disposal means.

SUMMARY OF THE INVENTION

Pursuant to the present invention, a bucket grit elevator system for removing grit from a settling tank partially filled with waste water is disclosed. In addition, a technique for efficiently and effectively removing grit from a settling tank is also taught. The system is comprised of substantially all plastic parts which reduces weight, the coefficient of friction, corrosion, and increases energy efficiency.

In accordance with the teachings of one embodiment of this invention, a system is provided for use in removing waste solids from a settling tank partially filled with waste water. Non-metallic buckets are provided for collecting and carrying the waste solids from the settling tank to an external disposal system. A conveyor drags the buckets along a bottom surface of the settling tank, then vertically lifts the buckets above the waste water level in the tank and then tilts the buckets to dump the collected waste solids into the external disposal system.

In the preferred embodiment the bucket includes a pair of wear shoes mounted on opposite sections of the rim portion of the bucket. A plurality of tapered dewatering slots in the bucket allow the collected waste water to exit from the bucket while retaining the majority of waste solids therein.

The waste water treatment system also preferably includes a split block bearing assembly for shaft and sprocket rotation in the settling tank. A split non-metallic tubular bearing surrounds the shaft and a lower housing member includes a recessed portion for receiving the tubular bearing. An upper housing member with a recessed portion receives the split tubular bearing. Provision is made for attaching the upper housing member to the lower housing member, as well as for coupling the split tubular bearing to the shaft thereby permitting the split tubular bearing and the shaft with the sprocket to rotate.

BRIEF DESCRIPTION OF DRAWINGS

The various advantages of the present invention will become apparent to those skilled in the art after reading the following specifications and by reference to the drawings in which:

FIG. 4 is a side view of the bucket members in accordance with the present invention;

FIG. 5 is a cross-sectional view, taken along lines 5—5 of FIG. 4, in accordance with the present invention;

FIG. 6 is a cross-sectional view, taken along lines 6—6 of FIG. 5, in accordance with the present invention;

DETAILED DESCRIPTION OF THE PREFERRED EMBODIMENT

The following description of the preferred embodiments is merely exemplary in nature and is in no way intended to limit the invention or its application or uses.

The present invention discloses a bucket grit elevator system employing components with resistivity to corrosion and which is useful for the removal of grit from a settling tank partially filled with waste water. The system comprises a series of bucket members which are disposed between two parallel chains and are dragged along the bottom surface of a settling tank collecting grit. Upon reaching an end of the settling tank, the bucket members are vertically lifted above the waste water level allowing the bucket members to de-water while retaining the collected grit. Finally, the bucket members are tilted allowing the collected grit to be dumped. The system further advantageously uses non-metallic split block bearing assemblies which facilitate removal of the system's shafts and sprockets. Also disclosed, is an efficient waste water treatment process for removing grit from a settling tank. It will be appreciated that producing the system out of all plastic components, such as Nylon-6, reduces weight, the coefficient of friction, and maintenance costs.

Figure 1:
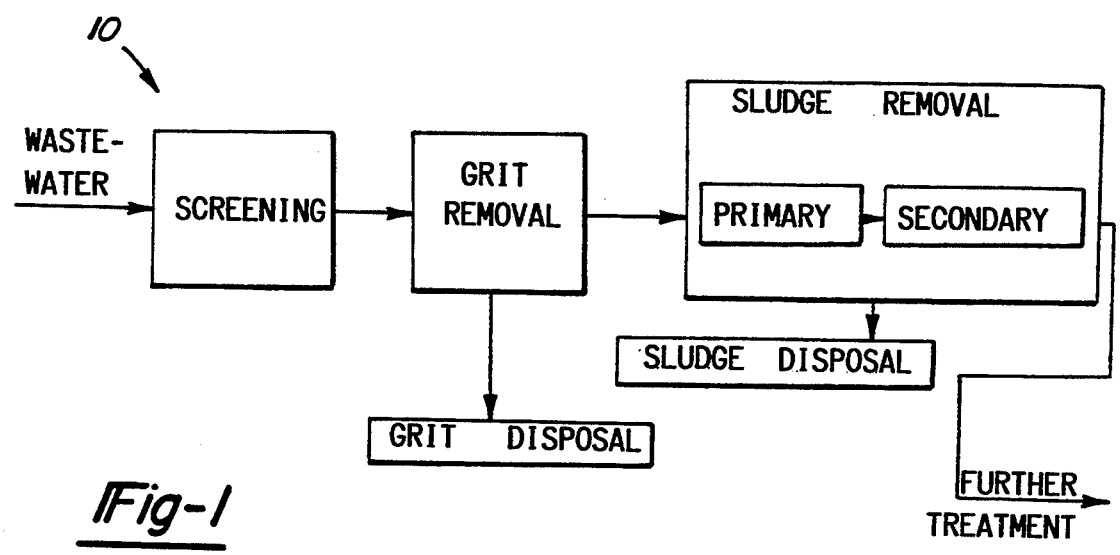
FIG. 1 is a block diagram of a typical waste water treatment process involving grit removal and other treatment steps.

First turning to FIG. 1, there is shown block diagram 10 of the typical steps involved in treating waste water.

Waste water which has been pumped from consumers is directed through a screening device for the removal of large solid objects. Next, a grit removal device separates the grit from the waste water and disposes of the grit. Lastly, the grit-free waste water is sent to primary and secondary sludge removal and disposal devices before being sent on for further treatment.

Figure 2:
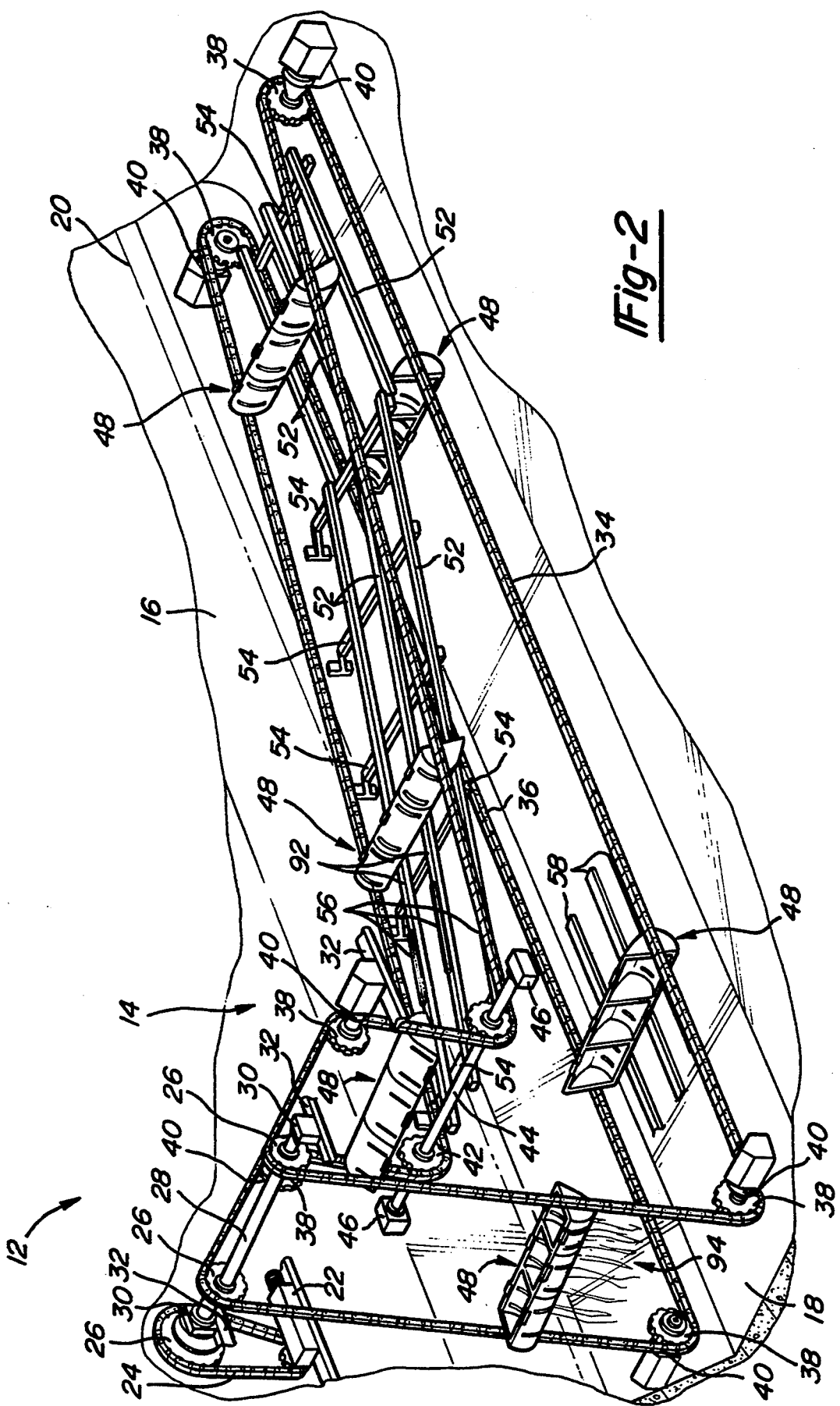
FIG. 2 is a perspective view of the bucket grit elevator system in accordance with the present invention.

FIG. 2 is an isometric view of bucket grit elevator system 12 including settling tank 14 having side walls 16 and bottom surface 18. During operation, settling tank 14 is partially filled with waste water containing waste solids such as grit, sludge, and scum up to waste water level 20.

Bucket grit elevator system 12 is driven by motor drive unit 22 which is coupled to drive chain 24. Sprockets 26 are driven by drive chain 24 through drive shaft 28, which rotates on split block bearing assemblies 30, which in turn are connected to structure 32. When driven, sprockets 26 drive chain 34 and chain 36. Chain 34, chain 36 and chain 24 all include the stainless steel tubular bearings disclosed in U.S. Pat. No. 4,766,997 to Hannum which is herein incorporated by reference. Chain 34 and chain 36 rotate freely on idler sprockets 38 which are free turning and connected to stub posts 40 which are disclosed in U.S. Pat. No. 4,645,598 to Hannum, which is also incorporated by reference. Stub posts 40 are connected to side walls 16 and structure 32. Chain 34 and chain 36 also rotate on sprockets 42 which are secured around idler shaft 44. In accordance with a preferred embodiment, drive shaft 28 and idler shaft 44 are made of glass filament-wound, 45 degree biaxial-wrap material or any other comparable non-metallic material. Shaft collars 98, which are disclosed in U.S. Pat. No. 4,645,598 to Hannum, are secured around drive shaft 28 and idler shaft 44. Idler shaft 44 rotates on split block bearing assemblies 46 which are mounted to side walls 16. Connected between chain 34 and chain 36 are a series of bucket means 48 which traverse bucket grit elevator system 12.

Return rail members 52 extend throughout the majority of settling tank 14 and are supported by cross support members 54, which in turn are connected to side walls 16. Return wear strips 56 are mounted on top of return rail members 52. Bucket means 48 make contact with return wear strips 56 during re-entry into the waste water filled portion of settling tank 14. Return rail members 52 support bucket means 48 reducing the load on chain 34 and chain 36. Bottom wear strips 58 extend along the majority of the length of bottom surface 18 reducing the coefficient of friction and the wear on bucket means 48.

In the preferred embodiment, the elements illustrated in FIG. 2, are made of a non-metallic material, such as plastic including cast Nylon-6.

Figure 3:
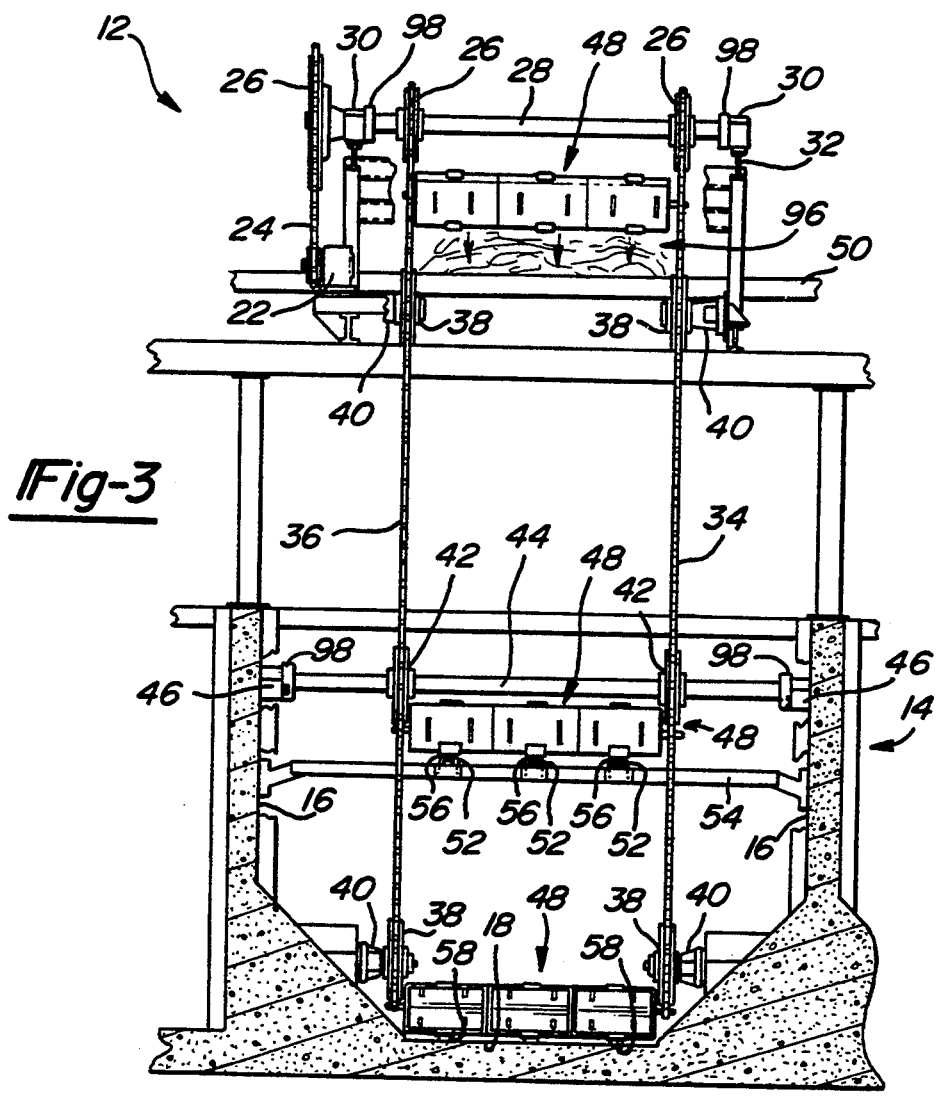
FIG. 3 is an end view of the bucket grit elevator system in accordance with the present invention.

FIG. 3 is a end view of bucket grit elevator system 12 illustrating bucket assembly 48 dumping collected grit 96 into external disposal system 50. Disposal system 50 is, for example, a cross conveyor. During operation of bucket grit elevator system 12, bucket assembly 48 travels on top of bottom wear strips 58 collecting grit from bottom surface 18. Upon reaching an end of settling tank 14, bucket assembly 48 vertically lifts collected grit 96 above waste water level 20, and bucket assembly 48 de-waters separating the majority of collected waste water 94 (see FIG. 2) from collected grit 96. After passing drive shaft 28, bucket assembly 48 tilts disposing of collected grit 96 into external disposal means 50. Lastly, bucket assembly 48 slides on top of return wear strips 56 during re-entry into the waste water filled portion of settling tank 14.

FIG. 4 is a sectional view of bucket assembly 48 which is capable of reversible mounting between chain 34 and chain 36 by bolts 92 and nuts 124. Bucket assembly 48 includes bucket members 60 having a concave shape. Wear shoes 62 are mounted on opposite sections of rims 100 with bolts 122 enabling periodic replacement. Wear shoes 62 are preferably made of cast Nylon-6. Bucket members 60 are connected in a serial fashion with bolts 126 and nuts 128 forming bucket means 48. However, the use of a single bucket member attached between a pair of chains is also within the scope of the present invention. Compared to prior steel systems which drag steel members along a settling tank's bottom surface, having wear shoes 62 ride on bottom wear strips 58 and return wear strips 56 reduces the tensile load on chain 34 and chain 36 and the amount of wear on all plastic components involved.

Bucket members 60 have numerous tapered de-watering slots 64 which function as a means for separating collected waste water 94 from collected grit 96 when bucket means 48 is vertically lifted by chain 34 and chain 36 above waste water level 20 (see FIG. 2). The force of gravity causes collected waste water 94 to exit bucket members 60 through tapered de-watering slots 64.

FIG. 5 is a cross-sectional view, taken along lines 5—5 of FIG. 4, illustrating tapered de-watering slots 64. Bucket members 60 have inside surface 66 and outside surface 68. Tapered de-watering slots 64 extend from inside surface 66 to outside surface 68 and are positioned throughout bucket members 60 allowing waste water 94 to constantly exit bucket means 48 even when tilted at various angles.

FIG. 6 is a cross-sectional view, taken along lines 6—6 of FIG. 5, illustrating the shape of tapered de-watering slots 64 which are tapered outwardly from inside surface 66 to outside surface 68. Such tapering allows collected waste water 94 to exit bucket members 60 while retaining the majority of collected grit 96. It should be noted that the shape of tapered de-watering slots 64 is used by way of example, and other degrees of tapering are within the scope of the present invention. Also, such tapering has a self-cleansing effect which reduces the frequency that tapered de-watering slots 64 become clogged with waste material.

In the preferred embodiment, the elements illustrated in FIGS. 3, 4, 5, and 6 are made of a non-metallic material, such as plastic including cast Nylon-6.

Figure 7:
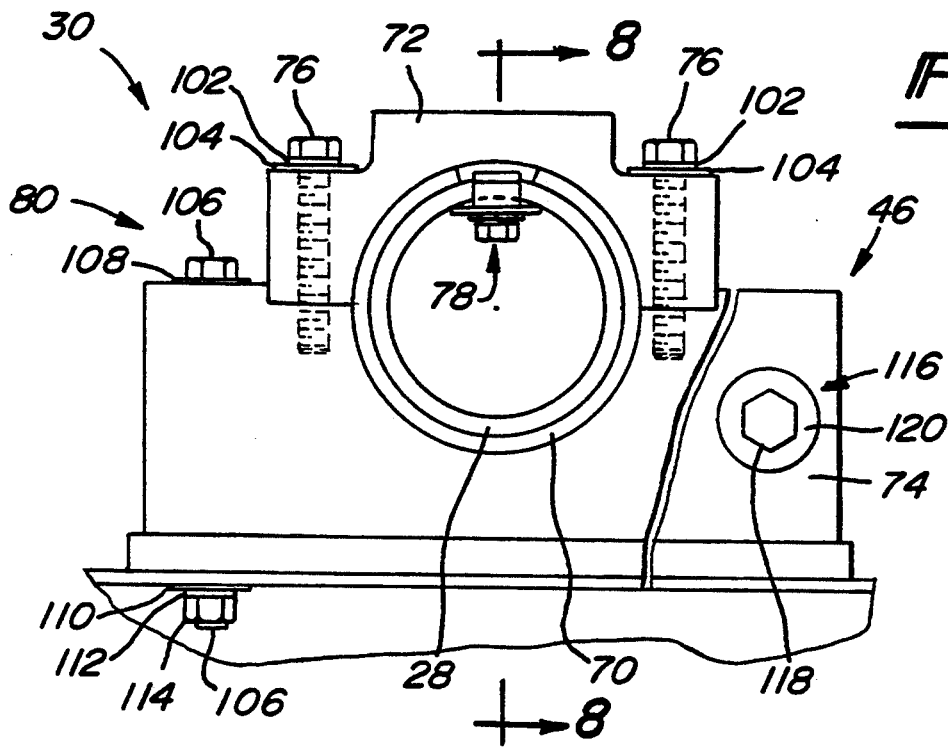
FIG. 7 is a view of the split block bearing assembly showing two possible embodiments in accordance with the present invention.

FIG. 7 is a side view of split block bearing assemblies 30 in accordance with a preferred embodiment and split block bearing assemblies 46 also in accordance with a preferred embodiment. Split non-metallic tubular bearing 70 surrounds drive shaft 28 or idler shaft 44 and is enclosed by upper housing member 72 and lower housing member 74. Split non-metallic tubular bearing 70 is made of ultra high molecular weight plastic or other non-metallic materials such as cast Nylon-6 and is replaceable. Both upper housing member 72 and lower housing member 74 have a semi-circular recessed area for receiving split non-metallic tubular bearing 70. Upper housing member 72 is secured to lower housing member 74 by bolts 76, lock washers 102, and flat washers 104. The use of bolts 76 allows upper housing member 72 and lower housing member 74 to be easily separated for routine maintenance procedures. Split block bearing assemblies 30 further have attachment means 80, enabling vertical mounting to structure 32, which consists of bolts 106, flat washers 108, flat washers 110, lock washers 112, and nuts 114. Split block bearing assemblies 46 further have attachment means 116, enabling horizontal mounting to side walls 16, which consists of bolts 118 and flat washers 120. It should be noted that attachment means 80 and attachment means 116 are used by way of example, and other means of attachment such as screws, rivets, or the equivalent of are within the scope of the present invention. Drive shaft 28 or idler shaft 44 is coupled to split non-metallic tubular bearing 70 by coupling means 78, permitting shaft and sprocket rotation.

Figure 8:
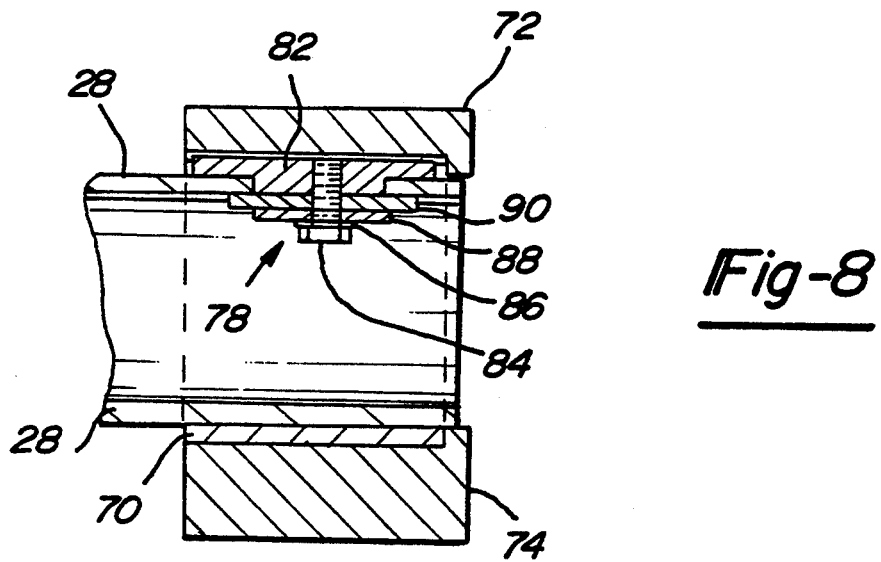
FIG. 8 is a cross-sectional view, taken along 8—8 of FIG. 7, in accordance with the present invention.

FIG. 8 is a cross-sectional view along the lines 8—8 of FIG. 7. Coupling means 78 comprises T-shaped key member 82 which extends through an aperture in drive shaft 28 or idler shaft 44 and has a threaded aperture for receiving bolt 84 with lock washer 86, flat washer 88, and flat washer 90. T-shaped key member 82 is positioned within the opening of split non-metallic tubular bearing 70 allowing rotation with drive shaft 28 or idler shaft 44. It will be appreciated that the shape and size of T-shaped key member 82 may be varied depending on the size of the openings of split non-metallic tubular bearing 70 and drive shaft 28 or idler shaft 44.

In the preferred embodiment, the elements illustrated in FIGS. 7 and 8 are made of a non-metallic material, such as plastic including cast Nylon-6.

In accordance with the present invention, the bucket assembly 48, connected between chain 34 and chain 36 is dragged along bottom surface 18 in opposition to the flow of the waste water entering settling tank 14 collecting settled grit 96 from bottom surface 18. Wear shoes 62 exclusively make contact with bottom wear strips 58 during this movement. Next, after reaching the end of settling tank 14, from which the waste water enters settling tank 14, chain 34 and chain 36 vertically lift bucket means 48 from a point below waste water level 20 to a point above waste water level 20. Once above waste water 20 level, tapered de-watering slots 64 de-water bucket means 48 by allowing collected waste water 94 to exit bucket means 48 due to gravity and prevent the majority of collected grit 96 from exiting. Next, chain 34 and chain 36 tilt bucket means 48 to an angle sufficiently large to dump the collected grit 96 into external disposal means 50. Once empty, bucket means 48, traveling along return rail members 52 with wear shoes 62 exclusively making contact with return wear strips 56, re-enter the waste water filled portion of settling tank 14.

From the foregoing it can be seen that the use of plastic bucket means 48 to collect, carry, de-water, and dispose of waste solids plus the use of split block bearing assemblies 30 and 46 for shaft and sprocket rotation have several useful consequences. Compared to a grit removal system with steel components, the bucket grit elevator system has increased resistance to corrosion, and the system's weight, coefficient of friction, and wear between components is reduced. This combination of factors results in a bucket grit elevator system with a life expectancy of more than six times that of a comparable steel system, and the bucket grit elevator system has reduces maintenance costs. Of course, the teachings of the present invention can be employed to produce a bucket grit elevator system for use in other environments requiring separation of solid materials from liquids, and the system can be made with variations in the materials used.

The foregoing discussion discloses and describes merely exemplary embodiments of the present invention. One skilled in the art will readily recognize from such discussion, and from the accompanying drawings and claims, that various changes, modifications, and variations can be made therein without departing from the spirit and scope of the present invention as defined by the following claims.

What is claimed is:

1. A waste water treatment system for removing waste solids for a settling tank partially filled with waste water, said system comprising:
    non-metallic bucket means for collecting and carrying the waste solids from the settling tank to an external disposal means, said bucket means including a plurality of tapered de-watering slots positioned at a plurality of locations throughout the bucket means allowing the collected waste water to exit said bucket means while retaining a majority of the collected waste solids when vertically lifted above a waste water level in the settling tank;
    conveyor means for dragging said bucket means along a bottom surface of the settling tank, for vertically lifting said bucket means above the waste water level in the settling tank, and for tilting said bucket means to dump the collected waste solids into the external disposal means; and
    mounting means for detachably mounting the non-metallic bucket means to the conveyor means such that said bucket means is reversible between a first and a second position.

2. The system of claim 1, wherein said de-watering slots are tapered outwardly from an inside surface of said bucket means to an outside surface of said bucket means so as to retain the majority of the collected waste solids.

3. The system of claim 1, wherein said conveyor means comprises a plurality of non-metallic split block bearing assemblies, with at least one shaft being rotatable thereon.

4. The system of claim 3, wherein said non-metallic split block bearing assembly comprises:
    a split non-metallic tubular bearing surrounding said shaft;
    a lower housing member with a recessed portion for receiving said split tubular bearing;
    an upper housing member with a recessed portion for receiving said split tubular bearing;
    securing means for attaching said upper housing member to said lower housing member; and
    coupling means for coupling said split tubular bearing to said shaft permitting said split tubular bearing and said shaft to rotate freely during operation of said system.

5. The system of claim 4 wherein said coupling means comprises:
    a bolt;
    a plurality of washers with apertures for receiving said bolt; and
    a T-shaped key member with a threaded aperture for receiving said bolt with said washers, whereby said T-shaped key member is rigidly secured within an opening in said split tubular bearing and extends through an aperture in said shaft such that said bearing rotates with said shaft.

6. A waste water treatment bucket elevator system with improved durability and efficiency for use in removing waste solids from a settling tank partially filled with waste water, said system comprising:
- a pair of non-metallic chains;
- a pair of non-metallic sprockets for driving said chains;
- a non-metallic drive shaft connected between said pair of drive sprockets;
- a least two non-metallic split block bearing assemblies with said drive shaft being rotatable thereon, said assemblies including attachment means for vertical and horizontal mounting;
- at least two bucket members for collecting and carrying the waste solids, said bucket members having a plurality of tapered de-watering slots located throughout the bucket members allowing the collected waste water to exit said bucket member when vertically lifted above a waste water level in the settling tank; and
- coupling means for coupling the bucket members in a serial manner between said chains, whereby said chains drag said bucket members along a bottom surface of the settling tank, vertically lift said bucket members above the waste water level in the settling tank, and tilt said bucket members to dump the collected waste solids into an external disposal means.

7. The bucket elevator system of claim 6, further comprising:
- a plurality of return rail members supporting said bucket members along the majority of the length of the settling tank during re-entry into a waste water filled portion of the settling tank;
- a plurality of return wear strips attached to a top surface of said return rail members; and
- a plurality of bottom wear strips attached to a bottom surface of the settling tank, said chains being secured to said bucket members such that said drive chains do not come into contact with the settling tank thereby reducing friction and increasing the lifetime of said drive chains.

8. The bucket elevator system of claim 6 wherein said chains, sprockets, bucket members, and split block bearing assemblies all comprise plastic members.

9. The bucket elevator system of claim 6, wherein said de-watering slots are tapered outwardly from an inside surface of said bucket members to an outside surface of said bucket members so as to retain the majority of the collected waste solids.

10. The bucket elevator system of claim 9, wherein each of said bucket members further comprise:
- a rim; and
- a pair of wear shoes mounted on opposite sections of said rim such that said wear shoes exclusively make contact with said return wear strips and said bottom wear strips during operation of said bucket elevator system.

11. The bucket elevator system of claim 6, wherein said non-metallic split block assembly comprises:
- a split non-metallic tubular bearing surrounding said drive shaft;
- a lower housing member with a recessed portion for receiving said split tubular bearing;
- an upper housing member with a recessed portion for receiving said split tubular bearing;
- securing means for attaching said upper housing member to said lower housing member; and
- coupling means for coupling said split tubular bearing to said drive shaft permitting said split tubular bearing and said drive shaft with said sprockets to rotate during operation of said bucket elevator system.

12. The bucket elevator of claim 11, wherein said coupling means comprises:
- a bolt;
- a plurality of washers with apertures for receiving said bolt; and
- a T-shaped key member with a threaded aperture for receiving said bolt with said washers, whereby said T-shaped key member is rigidly secured within an opening in said split tubular bearing and extends through an aperture in said shaft such that said bearing rotates with said shaft.

13. A bucket member secured between a pair of chains of a conveyor system for collecting and carrying waste solids from a settling tank partially filled with waste water, said bucket member comprising:
- a non-metallic concave member having an inside surface, an outside surface and a rim;
- a pair of wear shoes mounted on opposite sections of said rim;
- mounting means for detachably mounting the bucket member between the pair of chains such that the bucket member is reversible between a first and a second position; and
- said concave member having a plurality of tapered de-watering slots located throughout the concave member and being tapered outwardly from said inside surface to said outside surface allowing the connected waste water to exit said concave member when titled at various angles with the majority of the collected waste solids being retained therein.

14. A split block bearing assembly for shaft and sprocket rotation in a settling tank partially filled with waste water which is part of a waste water treatment system, said bearing assembly comprising:
- a split non-metallic tubular bearing surrounding the shaft;
- a lower housing member with a recessed portion for receiving said split tubular bearing;
- an upper housing member with a recessed portion for receiving said split tubular bearing;
- securing means for attaching said upper housing member to said lower housing member; and
- coupling means for coupling said split tubular bearing to the shaft permitting said split tubular bearing and the shaft with the sprocket to rotate, said coupling means including:
  - (a) a bolt;
  - (b) a plurality of washers with apertures for receiving said bolt; and
  - (c) a T-shaped key member with a threaded aperture for receiving said bolt with said washers, whereby said T-shaped key member is rigidly secured within an opening in said split tubular bearing and extends through an aperture in said shaft such that said bearing rotates with said shaft.

15. A method of waste water treatment for removing waste solids from a settling tank partially filled with waste water comprising the steps of:
- providing a conveyor system having a pair of chains in the settling tank;
- providing at least two non-metallic bucket members;
- providing coupling means for coupling the bucket members in a serial fashion between the chains;

dragging the bucket members along a bottom surface of the settling tank for collecting the water solids;

lifting the bucket members to carry the waste solids above a waste water level in the settling tank;

separating the majority of the waste water carried above the waste water level from the collected waste solids prior to disposing of the collected waste solids; and disposing of the waste solids onto a surface of a disposal system located above the waste water level in the settling tank.

16. The method of claim 5, wherein said step of separating the majority of the waste water from the waste solids comprises the step of passing the collected waste water through a plurality of tapered de-watering slots formed in said bucket members.

17. The method of claim 11, wherein said step of disposing of the waste solids above the waste water level in the settling tank comprises the step of tilting said bucket means to dump the collected waste solids into an external disposal means.

18. The method of claim 5, wherein the waste solids comprise non-biodegradable materials.

* * * * *

UNITED STATES PATENT AND TRADEMARK OFFICE
CERTIFICATE OF CORRECTION

PATENT NO. : 5,336,417

DATED : August 9, 1994

INVENTOR(S) : Joseph R. Hannum

It is certified that error appears in the above-identified patent and that said Letters Patent is hereby corrected as shown below:

Col. 7, line 8, "a" should be --at--.
Col. 7, line 58, after "block" insert --bearing--.
Col. 9, line 2, "water" should be --waste--.
Col. 10, line 1, "5" should be --15--.
Col. 10, line 6, "11" should be --16--.
Col. 10, line 11, "5" should be --15--.

Signed and Sealed this

Sixth Day of December, 1994

Attest:

BRUCE LEHMAN

Attesting Officer

Commissioner of Patents and Trademarks